Dec. 6, 1966   J. H. METTERSHEIMER, JR., ET AL   3,289,499
APPARATUS FOR RECONDITIONING BUSHING STRUCTURES
Filed June 30, 1965                                          3 Sheets-Sheet 3
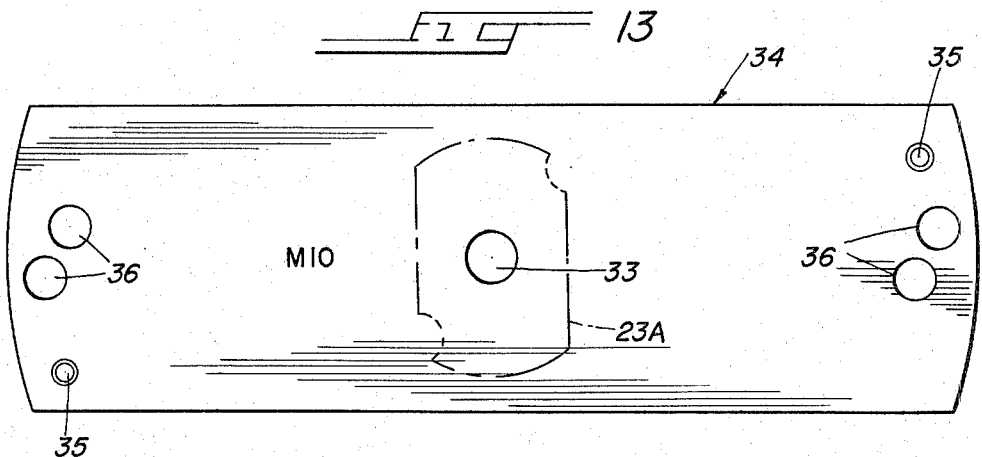
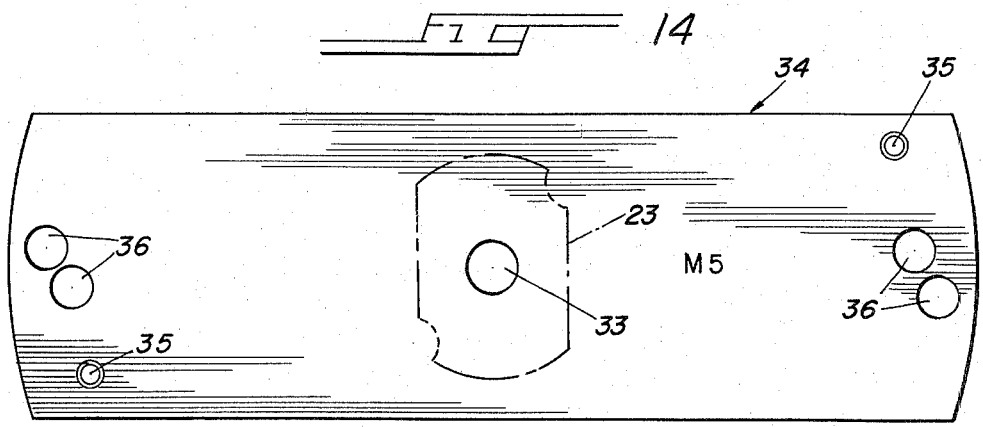
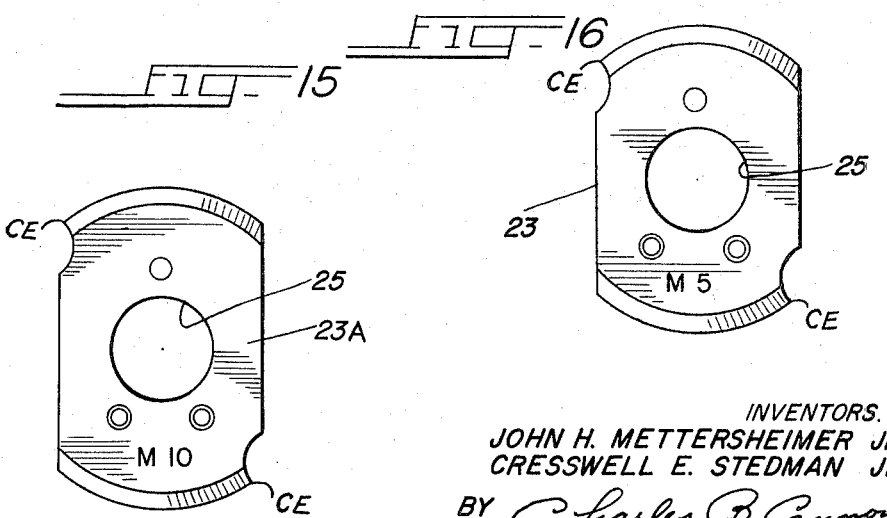
INVENTORS.
JOHN H. METTERSHEIMER JR.
CRESSWELL E. STEDMAN JR.
BY Charles B. Cannon
THEIR ATTY United States Patent Office 3,289,499
Patented Dec. 6, 1966

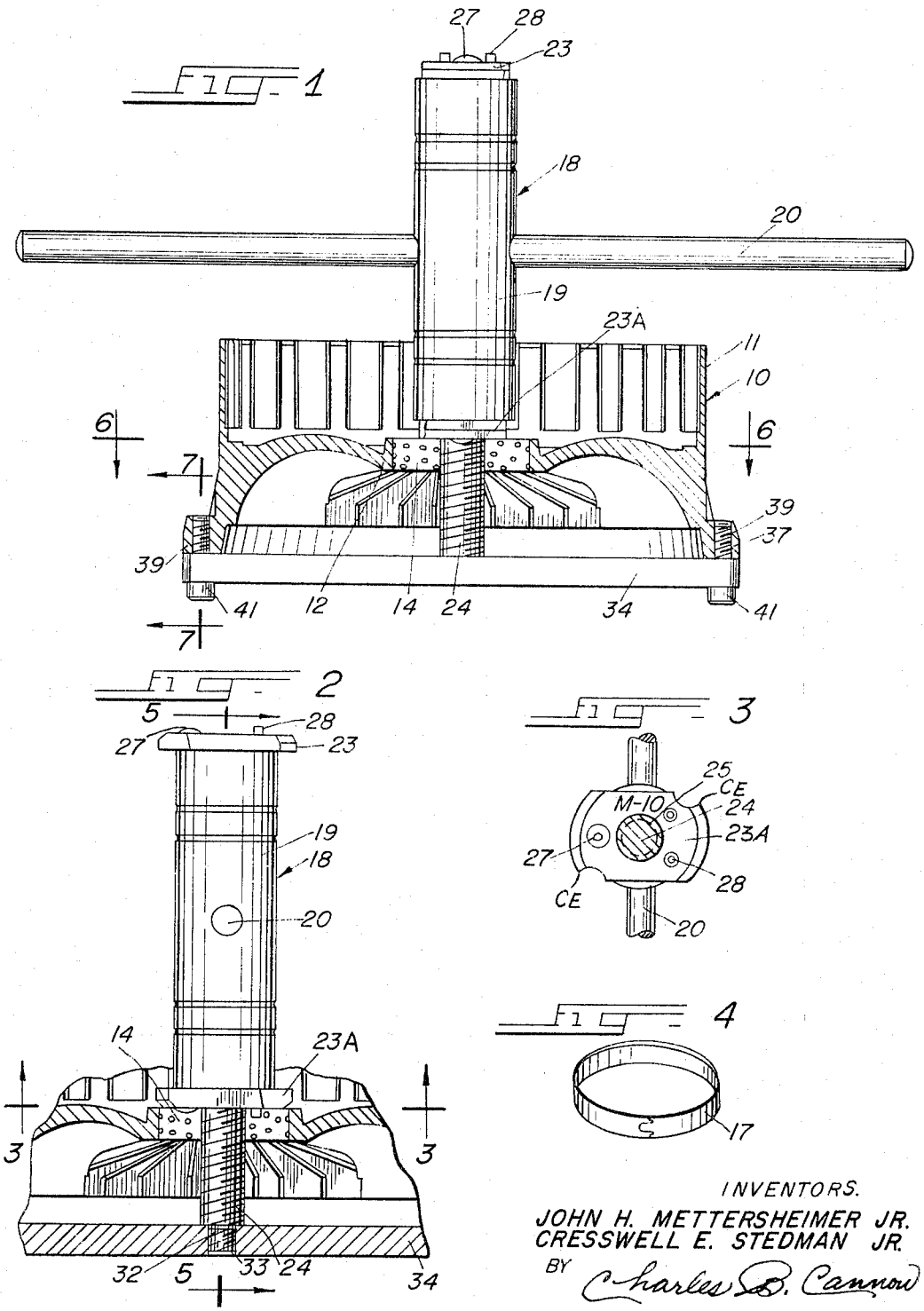

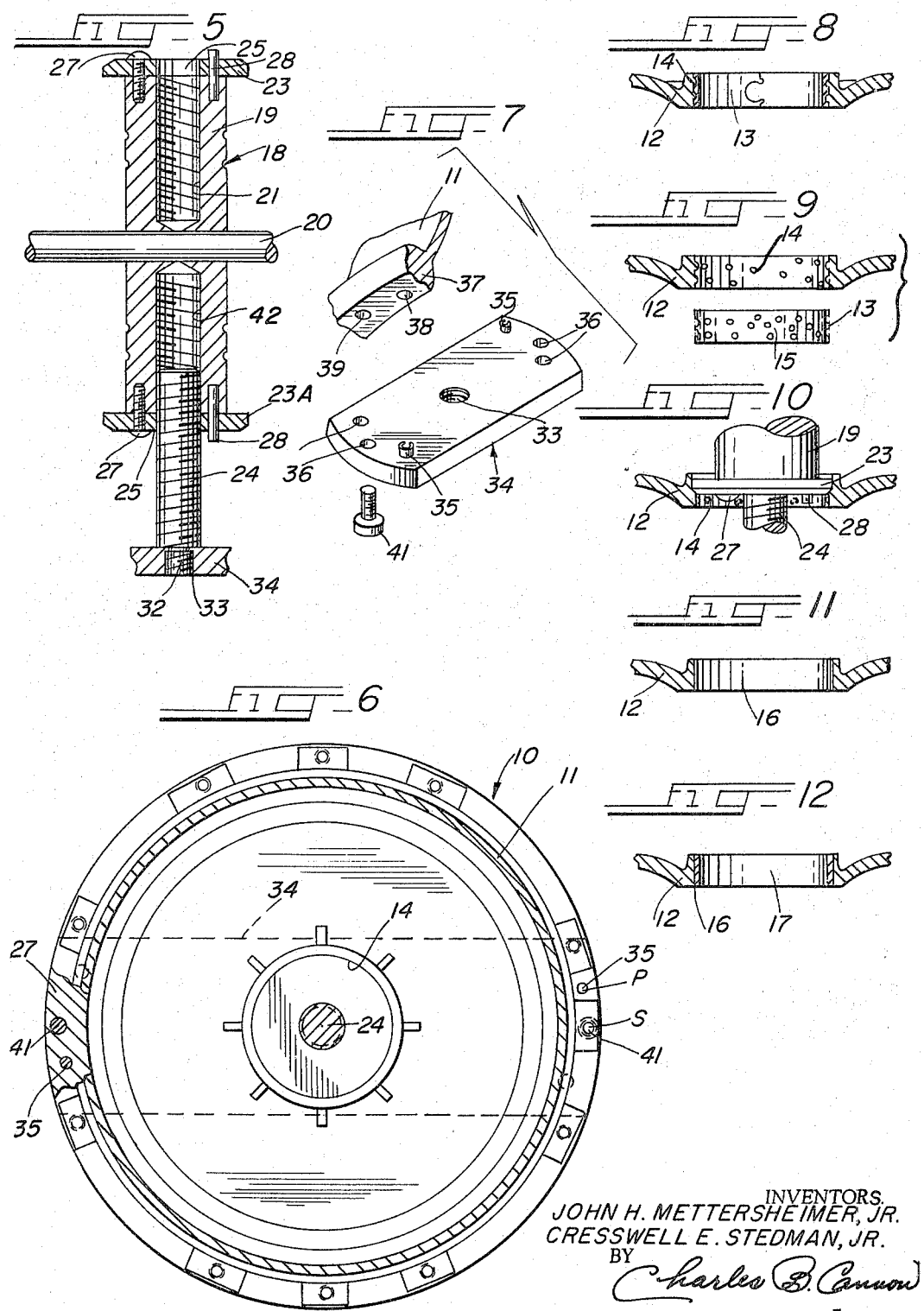

3,289,499
APPARATUS FOR RECONDITIONING
BUSHING STRUCTURES
John H. Mettersheimer, Jr., and Cresswell E. Stedman, Jr., both of Miami, Fla., assignors to M & S Tool Co., Inc., Miami, Fla., a corporation of Florida
Filed June 30, 1965, Ser. No. 468,232
10 Claims. (Cl. 77—2)

This invention relates to an apparatus and method for reconditioning the multiplier-supporting bushing structures of certain automotive vehicle transmission devices.

It is a common practice in the art at the present time for certain manufacturers of automotive vehicles and automatic transmission apparatus therefor to provide a so-called driving torus member and multiplier-supporting bushing therefor which are so designed, constructed and arranged that it has not been possible heretofore to replace or recondition the multiplier-supporting bushing in the driving torus after it has become worn and needs replacement or reconditioning, with the result that the owner of the vehicle embodying such an automatic transmission driving torus has been forced to purchase an entirely new driving torus and bushing assembly, at a substantial expense.

More specifically, the so-called driving torus members of the General Motors Roto-Hydromatic transmissions known as models RHM 375 and RHM 240, which are commonly known in the trade as model 10 and model 5, respectively, embody multiplier-supporting bushings which are permanently mounted in the driving torus in such a manner that they cannot be removed and replaced when they are worn and require replacement.

In automatic transmissions of the character referred to about the driving torus and cover act as a torque converter and the bushing in the driving torus supports what is known as the multiplier, which acts as the stator employed in other types of automotive vehicle transmissions, and if and when the multiplier supporting bushing becomes worn and fails, one result of such failure is that there is then no effective fourth gear in the transmission and, in addition, other problems arise.

Accordingly, an object of the present invention is to provide a novel reboring apparatus for reconditioning the multiplier-supporting bushing structures of the so-called driving torus members of the aforesaid automotive vehicle automatic transmission assemblies to the end that when the multiplier-supporting bushing become worn it may be removed and the bushing opening rebored and a new bushing or bearing installed therein, thereby eliminating the necessity for purchasing an entirely new driving torus assembly.

Another object of the invention is to provide a new and relatively inexpensive reboring apparatus for use in reboring the multiplier-supporting bearing or bushing opening of an automotive vehicle transmission driving torus and coupling assembly.

An additional object of the present invention is to provide a novel apparatus for reboring the multiplier-supporting bearing or bushing opening in the driving torus of both the model RHM 375 (model 10) and the model RHM 240 (model 5) Roto-Hydromatic automotive vehicle transmissions.

An additional object of the present invention is to provide in and as a part of the new multiplier-supporting bushing structure reboring apparatus novel means for locating the cutter-bearing head on the driving torus of an automotive vehicle transmission unit, of the character referred to herein, so as to properly locate the cutter-bearing head to enable it to perform the desired reboring operation in the multiplier-supporting bushing opening in the driving torus of the particular model of automotive transmission unit in which the reboring operation is to be performed.

An additional object of the invention is to provide a novel method for reconditioning the multiplier-supporting bushing structure of the driving torus of an automotive vehicle transmission unit of the character herein described.

Other objects will appear hereinafter.

In the drawings:

FIG. 1 is a view, partly in elevation and partly in section, of a preferred form of the new multiplier-supporting bushing reboring apparatus mounted in position of use upon a driving torus and coupling assembly;

FIG. 2 is a fragmentary view, partly in elevation and partly in vertical section of the driving torus bushing reboring apparatus and driving torus and coupling assembly shown in FIG. 1;

FIG. 3 is a sectional plan view, on line 3—3 in FIG. 2 of one of the cutter heads embodied in the new driving torus bushing reboring apparatus shown in FIGS. 1 and 2;

FIG. 4 is a perspective view of a replacement bearing or bushing unit which is adapted to be inserted into the rebored bearing or bushing housing of the driving torus bushing assembly shown in FIGS. 1 and 2, as an incident to the practice of the present invention;

FIG. 5 is a central vertical sectional view on line 5—5 in FIG. 2;

FIG. 6 is a sectional plan view on line 6—6 in FIG. 1;

FIG. 7 is an exploded fragmentary perspective view showing part of the locating means embodied in the present invention for locating the cutter-bearing head of the new driving torus bushing reboring apparatus in position of use on the driving torus and coupling assembly;

FIG. 8 is a central vertical sectional view of the original equipment driving torus bearing or bushing unit in assembled position;

FIG. 9 is a sectional view of the original driving torus bearing or bushing assembly shown in FIG. 8, as disassembled;

FIG. 10 is a fragmentary central vertical sectional view showing the cutter-bearing head of the new driving torus reboring apparatus in position of use to rebore the multiplier-supporting bearing or bushing opening in the body of the driving torus member;

FIG. 11 is a view showing the driving torus bearing or bushing housing, illustrated in FIGS. 8, 9 and 10, rebored for the reception of a new bearing or bushing;

FIG. 12 is a central vertical sectional view showing the rebored bushing housing of the driving torus and a new bushing or bearing installed therein;

FIG. 13 is a plan view of the locating plate member embodied in the new driving torus reboring apparatus with the identifying legend thereon for locating the cutter-bearing head upon the driving torus of the so-called model RHM 375 (model 10) Roto-Hydromatic transmission;

FIG. 14 is a plan view of the locating plate member shown in FIG. 13 with the identifying legend thereon for properly locating the cutter-bearing head on the driving torus of the so-called RHM 240 (model 5) Roto-Hydromatic transmission;

FIG. 15 is a bottom plan view of one of the cutter bars embodied in the present invention and for use in reboring the bushing opening in the model RHM (model 10) Roto-Hydromatic transmission; and FIG. 16 is a bottom plan view of the cutter bar embodied in the present invention for reboring the bushing opening in the so-called RHM 240 (model 5) Roto-Hydromatic transmission.

A driving torus assembly of an automotive vehicle transmission of the type referred to above, is illustrated in the drawings, wherein it is generally indicated at 10, and comprises a driving torus 11 which includes a central bushing or bearing housing portion 12 in which there is mounted a bushing or bearing 13 which serves to support the multiplier in the transmission unit, as described above. The interior surface of the bearing housing portion 12 has a so-called dimpled surface formed by a plurality of inwardly projecting "dimples" or bosses 14, and the driving torus bearing or bushing 13 has an external surface which is provided with recesses or indentations 15 which are complementary to and which are adapted to receive the so-called "dimples" or bosses 14 on the interior surface of the bushing or bearing housing portion 12.

It has been the practice heretofore of the manufacturer of the automotive vehicles and automatic transmissions therefor, referred to above, to make the coupling and bearing or bushing assemblies 11-12-13 with the "dimpled" surface 14 on the interior of the driving torus bushing or bearing housing portion 12 of the driving torus 11, and the corresponding recesses or indentations 15 on the external surface of the bearing or bushing 13, in such a manner that after the original bearing or bushing 13 has become worn it cannot be removed from the driving torus and replaced with a new bearing or bushing 13. This is because of the fact that the arrangement of the "dimples" or bosses 14 on the interior surface of the bushing or bearing housing portion 12 and the corresponding mating recesses or indentations 15 on the external surface of the bushing or bearing 13 are especially designed and made and cannot be reproduced by automotive vehicle transmission repair shops, machine shops, or the like.

The present invention provides a novel driving torus bushing reboring apparatus and cutter means embodied therein for enabling the bearing housing portion 12 of the driving torus 11 to be rebored and a new bushing installed therein and which, while different from the original bushing, serves equally well to support the multiplier and as a stator. To this end the present invention provides a driving torus bushing housing reboring apparatus for reboring the "dimpled" interior surface of the bearing or bushing housing portion 12 of the driving torus 11 of either a model RHM 375 (model 10) or a model RHM 240 (model 5) Roto-Hydromatic transmission and to provide a new and smooth interior surface 16 therein (FIG. 11) which will receive a new bearing or bushing 17, as illustrated in FIG. 12 of the drawings.

Thus, in order to accomplish the foregoing and other objects thereof, the present invention provides a driving torus bushing reboring apparatus, generally indicated at 18, and comprising a generally cylindrical cutter-bearing head 19, which is preferably formed of brass or like heavy but machinable metal, to which a handle member 20 is attached; the handle member 20 extending through an opening 21 which is formed centrally in the body of the cutter-bearing head 19. The cutter-bearing head 19 includes a pair of internally threaded bores 22 and 23 which are arranged on opposite sides of the centrally arranged handle member 20 (FIG. 5), and these internally threaded bores 22 and 23 are provided with fine threads, for a reason which will be pointed out hereinafter.

A hard steel cutter bar 23 is removably mounted on one end portion of the body of the cutter-bearing head 19, and a second cutter bar 23A is removably mounted on the opposite end portion of the body of the cutter-bearing head 19, as by means of one or more fastening elements in the form of screws 27, and so-called roll pin members 28 which are welded or otherwise fixedly attached to each of the cutter bars 26. Each of these roll pin members 28 has an inner end portion 29 which extends into an opening 30 formed in the body of the cutter-bearing head 19, and each of the roll pin members 28 has an outer end portion 31 which extends outwardly beyond the outer surface of the cutter bar 23. The roll pin members 28 prevent the cutter bars 23 and 23A from rotating relative to the body of the cutter-bearing head 19 and also prevent shearing of the fastening elements or screws 27 during operation of the new reboring apparatus, as described hereinafter.

Each of the cutter bars 23 and 23A is provided with a pair of opposed cutting edges CE which are spaced 180° apart thereon. The two cutter bars 23 are identical in design but differ in size; the cutter bar 23A being designed for use in reboring the bushing or bearing opening in the bushing housing portion of the driving torus of the so-called model 10 automotive transmission, and the other cutter bar 23 being designed for use in reboring the bushing or bearing opening in the driving torus of the so-called model 5 automotive transmission, as described above. Each of the cutter bars is also provided on its lower surface with a suitable identifying legend, namely, "M-10" (FIGS. 3 and 15) and "M-5" (FIG. 16). Thus, the cutter bar 23A which is adapted for use in reboring the bearing or bushing opening in the driving torus of the M-10 unit is shown as being mounted at the bottom of the cutter-bearing head 19 (FIG. 3) and the cutter bar 23 which is adapted for use in reboring the bearing or bushing opening in the driving torus of the so-called M-5 transmission is shown as being mounted at the top of the cutter-bearing head 19, as the parts are shown in the drawings.

A screw threaded member of so-called lead screw 24 is shown as being adjustably and removably mounted in the lower internally threaded bore 42 of the cutter-bearing head 19. However, this screw-member or so-called lead screw 24 is adapted to be mounted selectively in either of the two centrally arranged threaded bores 21 and 42 in the cutter-bearing head 19, and when so mounted the screw member 24 is adapted to project through and to work through a central opening 25 which is formed in each of the cutter bars 23 and 23A.

The screw member 24 has a reduced externally threaded cutter end portion 33 which is adapted to be threaded into a centrally arranged threaded opening 33 in a locating plate member 34, which will now be described.

The present invention provides a locating plate member 34 (FIGS. 13 and 14) which is adapted selectively to position the new driving torus bushing reboring apparatus 10 upon the driving torus of either the so-called model 10 or the so-called model 5 automatic transmission, so as to properly rebore the bushing or bearing therein. It will be understood, in this connection, that the bearing or bushing openings 14 in the bodies of the driving torus members 11 of the so-called M-10 and M-5 transmissions are similar in design and construction but differ in diameter.

To this end the locating plate member 34 is provided on one surface with the legend "M-10" (FIGS. 3 and 13) and it is provided on its other surface with the legend "M-5" (FIG. 14).

The locating plate member 34 has locating pins 35 mounted on both its upper and lower surfaces (FIGS. 7, 13 and 14) which are adapted to fit into locater pin openings 38 in a marginal flange portion 37 of the body of the driving torus 11, and the locating plate member 34 also has openings 36 formed therein for the reception of fastening elements in the form of bolts 37 (FIG. 7) by means of which the locating plate member 34 may be attached to the marginal flange 37 of the body of the driving torus 11. The locater pin openings 38 in the marginal flange portion 37 on the body of the driving torus 11 are used in such automotive vehicle transmission devices to assure a proper relationship between the driving torus 11 and the driving torus cover (not shown). The marginal flange portion 37 of the body of the driving torus 11 also has screw-threaded openings 39 formed in the lower surface thereof for the reception of fastening elements in the form of screws or bolts 41 by means of which the locating plate member 34 may be attached to the marginal flange portion 37 of the body of the driving torus 11. In the use of such automotive vehicle transmission devices the screw-threaded openings 39 are used to receive screws which hold the driving torus 11 to the driving torus cover (not shown).

In the practice of the present invention, the worn bushing 15 is driven out of the bearing opening 14 in the bearing housing portion 12 of the driving torus 11, in any suitable manner, as by means of a suitable driving tool and hammer. The locating plate member 34 is then located in position for reboring the bushing or bearing opening 14 in the bearing housing portion 12 of the body of the driving torus 11 of either the so-called M–10 or M–5 automotive vehicle transmission unit, as described above, as the case may be, and the cutter-bearing head 19 is positioned, as follows:

Thus, assuming that it is desired to rebore the bushing or bearing opening 14 in the bearing housing portion 12 of the driving torus 11 of the M–10 model automotive vehicle transmission, the cutter-bearing head 19 is positioned so that the identifying legend M–10 on the cutter 23A (FIGS. 3 and 15) faces downwardly toward the body of the driving torus 11. The locating plate member 34 is then also positioned so that the identifying legend M–10 on its then lower surface (FIG. 13) faces downwardly toward the bushing opening 14 which is to be rebored. The reduced threaded end portion 32 of the screw-threaded member or lead screw 24 is then threaded into the centrally arranged threaded opening 33 in the locating plate member 34 with the locating plate 34 so positioned that the identifying legend M–10 thereon faces downwardly toward the bushing opening 14 which is to be rebored.

When the parts are so arranged the cutter-bearing head 19 and attached locating plate member 34 are assembled with and are attached to the marginal flange portion 37 of the body of the driving torus 11 by inserting the locating pin members 35 on the upper surface of the locating plate member 34 into the locating pin openings 38 in the marginal flange portion 37 of the body of the driving torus 11 and inserting the fastening elements or bolts 41 through the openings 36 in the locating plate member 34 and into the threaded openings 39 in the marginal flange portion 37, of the body of the driving torus 11. When this has been accomplished, the parts are then assembled and positioned as shown in FIGS. 1 and 2 of the drawings. The driving torus 11 and attached locating plate member 34 and cutter-bearing head 19 may then be clamped in a vise or like holding means while the reboring operation is carried out.

The cutter-bearing head 19 may then be manually rotated by means of the handle 20, so as to drive the lower cutter member 23 thereon downwardly through the opening 14 in the bushing or bearing housing portion 12 of the driving torus 11, so as to rebore the dimpled or bossed internal surface 14 of the bearing or bushing housing portion 12 of the body of the driving torus 11, and thus provide a new and smooth uninterrupted surface 16 therein, as shown in FIG. 11. During this reboring operation the roll pin members 28 on the actuated cutter means 23 prevent rotation of the cutter members 23 and 23A and shearing of the fastening elements 27 by which the cutter members 23 and 23A are attached to the cutter-bearing head 19.

A new steel backed bronze bushing or bearing 17 may then be fitted into the thus rebored smooth and uninterrupted bearing surface 16 in the bearing housing portion 12 of the body of the driving torus 11, as shown in FIG. 12 of the drawings, and in this manner, the worn bearing or bushing 13 in the driving torus 11 is replaced and the driving torus repaired and reconditioned for further use without the necessity for purchasing an entirely new drive torus and coupling assembly.

It will be noted, in this connection, that the outside diameter of the new bushing 17 is larger than the original bushing 13 since the rebored opening 16 in the bushing housing portion of the driving torus is larger in diameter than the original bushing housing portion 12 of the driving torus 11, although the inside diameter of the new bushing 17 is the same as that of the original bushing 13.

In order to rebore the original worn bearing in the body of the driving torus 11 of the so-called M–5 automotive vehicle transmission unit, as described above, the screw-threaded member 24 is removed from the internally threaded bore 42 in the body of the cutter-bearing head 19 and is threaded into the other bore 21 therein. The position of the cutter-bearing head 19 is then reversed and is so positioned that the cutter member 23 thereon, which is adapted for reboring the bushing or bearing opening 14 in the M–5 model unit, faces downwardly toward the then locating plate member 34 and the locating plate member 34 is then assembled with the cutter-bearing head 19 and the driving torus 11, in the same manner as described above in connection with reboring the bearing or bushing opening 14 in the bearing housing portion 12 of the body of the M–10 drive torus, except that in this instance the locating plate member 34 is positioned with the identifying legend "M–5" thereon (FIG. 14) facing downwardly toward the bushing opening in the driving torus which is to be rebored.

The reboring operation may then be repeated to rebore the bearing or bushing opening 14 in the bearing or bushing housing portion 12 of the body of the drive torus 11 of the M–5 automotive vehicle transmission unit.

The internal threads in the centrally arranged bores 21 and 23 in the cutter-bearing head 19 are very fine so as to impart a slow rotary turning motion to the cutter member 23 when the latter is rotated by the cutter-bearing head 19 and the handle 20, thereby avoiding any danger of fracturing the metal in which the bushing opening 14 is formed in the central bushing housing portion 12 of the drive torus 11.

It will be noted that the locating pin members 35 and the openings 36 in the locating plate member 34 are so arranged and patterned that they are complementary to and correspond to the locations of the pin-receiving openings 38 and the bolt-receiving openings 39 in the marginal flange portions 37 of the driving torus members of the M–10 and M–5 transmission units, as described above, and which differ in the location of these openings 37–39, due to the fact that in the industry these parts for the manufacture of the automotive vehicle transmission unit in which they are embodied, and which necessitates the reversible design of the locating plate member 34.

It will thus be seen from the foregoing description, considered in conjunction with the accompanying drawings, that the present invention discloses a new and improved driving torus bushing reboring apparatus and a new and improved method for reconditioning the multiplier-supporting bushing structure of automotive vehicle transmission units of the character herein described, and that the invention thus has the desirable advantages and characteristics and accomplishes its intended purposes, including those hereinbefore pointed out and others which are inherent in the invention.

We claim:

1. A driving torus bushing reboring apparatus for reboring a bearing or bushing opening in the body of the driving torus member of an automotive vehicle transmission unit, comprising an elongated substantially cylindrical cutter-bearing head including an end portion having a cutter member attached thereto, said cutter member being provided with a centrally arranged opening, handle means carried by the said cutter-bearing head for rotating the latter, the said cutter-bearing head having a centrally arranged and axially extending internally threaded bore therein in alignment with said opening in said cutter member, a screw-threaded member adjustably mounted in the said axially extending internally threaded bore in the said cutter-bearing head and having a reduced externally threaded end portion, a locating plate member having a centrally arranged threaded opening therein for the reception of the said reduced externally threaded end portion of the said screw-threaded member, locating means cooperating with the said locating plate member and with the body of the driving torus member for locating the said cutter-bearing head and the said cutter member carried thereby in position to enable the said cutter member to only cylindrically rebore the bearing or bushing opening in the body of the said driving torus member.

2. A driving torus bushing reboring apparatus as defined in claim 1 in which the body of the said driving torus member has a marginal flange thereon provided with spaced locating pin-receiving openings, and in which the said locating means includes locating pin members carried by the said locating plate member and receivable in the said pin-receiving openings in the said marginal flange portion of the body of the said driving torus member.

3. A driving torus bushing reboring apparatus as defined in claim 1 in which the body of the said driving torus member has a marginal flange thereon provided with spaced locating pin-receiving openings, and in which the said locating means includes locating pin members carried by the said locating plate member and receivable in the said pin-receiving openings in the said marginal flange portion of the body of the said driving torus member, and which includes fastening means cooperating with the said locating plate member and with the said marginal flange portion of the body of the said driving torus member for detachably attaching the said locating plate member upon the body of the said driving torus member.

4. A driving torus bushing reboring apparatus for reboring bearing or bushing openings of varying diameters in the body of driving torus members of automotive vehicle transmission units, comprising an elongated substantially cylindrical cutter-bearing head having a pair of axially extending internally threaded bores therein extending inwardly from each end thereof, a cutter member detachably mounted upon the said cutter bearing head at each end thereof and having a centrally arranged opening therein, handle means carried by the said cuttter-bearing head for rotating the said cutter-bearing head and the said cutter members carried thereby, a screw threaded member selectively and adjustably mounted in the said axially extending internally threaded bores in the cutter-bearing head and having an end portion adapted to be projected selectively through the said centrally arranged openings in the said cutter members, locating means carrying said screw threaded member and co-operating selectively with each of the said cutter members for locating said screw threaded member and said cutter-bearing head and one of the said cutter members carried thereby in position of use upon the body of the driving torus of an automotive vehicle transmission unit to enable a selective one of the said cutter members to rebore the bushing or bearing opening in the body of the said driving torus member.

5. A driving torus bushing reboring apparatus as defined in claim 4 in which the said locating means includes a locating plate member having a centrally arranged threaded opening therein for the reception of the reduced threaded end portion of the said screw threaded member and in which the said locating plate member has locating pin members mounted thereon for and adapted to be inserted into pin-receiving openings formed in the body of the driving torus member.

6. A driving torus bushing reboring apparatus as defined in claim 4 in which the said locating means includes a locating plate member having a centrally arranged threaded opening therein for the reception of the reduced threaded end portion of the said screw threaded member and in which the said locating plate member has locating pin members mounted thereon for and adapted to be inserted into pin-receiving openings formed in the body of the driving torus member, and in which the said driving torus reboring apparatus has means for detachably attaching the said locating plate member to the body of the said driving torus member.

7. A driving torus bushing reboring apparatus for reboring the multiplier-supporting bushing openings of varying diameters in the body of the driving torus members of automotive vehicle transmission units comprising an elongated substantially cylindrical cutter-bearing head having axially opposed end portions each having an internally threaded bore therein extending inwardly from each end axially thereof, a screw threaded member selectively and adjustably mounted in each of the said axially extended internally threaded bores in the said cutter-bearing head, a cutter member attached to each of the said axially opposed end portions of the said cutter-bearing head, the said cutter members being adapted to bore openings of different diameters in the bushing housing portions of the bodies of the said driving torus members, and means cooperating with the said screw threaded member for selectively and detachably attaching each of the said axially opposed end portions of the said cutter-bearing head and the cutter members carried thereby to the body of the driving torus members of an automotive vehicle transmission unit and in position to enable the said cutter-bearing head and one of the said cutter members carried thereby to be rotated to rebore the multiplier-supporting bearing or bushing opening in the body of the said driving torus member.

8. A driving torus bushing reboring apparatus for reboring a bearing or bushing opening in the body of the driving torus member of an automotive vehicle transmission unit, comprising an elongated substantially cylindrical body including a cutter-bearing head on at least one end thereof, a cutter member attached to said cutter-bearing head, said cutter member being provided with a centrally arranged opening, handle means secured to and carried by the said body for rotating the latter, the said cutter-bearing head and body having a centrally arranged and axially extending internally threaded bore therein in axial alignment with the opening in said cutter member, a screw-threaded member adjustably mounted in the said axially extending internally threaded bore in the said body and cutter-bearing head and having a reduced externally threaded end portion, a locating plate member having a centrally arranged threaded opening therein for the reception of the said reduced externally threaded end portion of the said screw-threaded member, locating means cooperating with the said locating plate member and with the body of the driving torus member for locating the said cutter-bearing head and the said cutter member to rebore the bearing or bushing opening in the body of the said driving torus member.

9. A driving torus bushing reboring apparatus for reboring bearing or bushing openings of varying diameters in the body of driving torus members of automotive vehicle transmission units, comprising a reversible elongated substantially cylindrical body including a cutter-bearing head on each end thereof, said body having an axially extending internally threaded bore extending inwardly from each end thereof, a cutter member detachably mounted upon each of said cutter-bearing heads and each cutter having a centrally arranged opening therein in alignment with the respective bore in said body, handle means carried by said cylindrical body intermediate its ends for rotating the said cutter-bearing head and the said cutter members carried thereby, a screw threaded member having a reduced threaded end portion selectively and adjustably mounted in the said axially extending internally threaded bores in the cutter-bearing body and having an end portion adapted to be projected selectively through the said centrally arranged openings in the said cutter members, locating means carrying said screw threaded member and cooperating selectively with each of the said cutter members for locating said screw threaded member and said cutter-bearing head and one of the said cutter members carried thereby in position of use upon the body of the driving torus of an automotive vehicle transmission unit to enable a selective one of the said cutter members to rebore the bushing or bearing opening in the body of the said driving torus member.

10. A driving torus bushing reboring apparatus for reboring the multiplier-supporting bushing openings of varying diameters in the body of the driving torus members of automotive vehicle transmission units comprising a reversible elongated body member having axially opposed end portions each having an internally threaded bore therein extending inwardly from each end axially thereof, a screw threaded member selectively and adjustably mounted in each of the said axially extended internally threaded bores in the said body member, a cutter member attached to each of the said axially opposed end portions of the said body member, the said cutter members being adapted to bore openings of different diameters in the bushing housing portions of the bodies of the said driving torus members, and means cooperating with the said screw threaded member for selectively and detachably attaching each of the said axially opposed end portions of the said body member and the cutter members carried thereby to the body of the driving torus members of an automotive vehicle transmission unit and in position to enable the said body member and one of the said cutter members carried thereby to be rotated to rebore the multiplier-supporting bearing or bushing opening in the body of the said driving torus member.

References Cited by the Examiner
UNITED STATES PATENTS

| | | | |
|---|---|---|---|
| 274,470 | 3/1883 | Detterer | 145—114 |
| 1,747,060 | 2/1930 | Dunn | 90—12.5 |
| 2,985,040 | 5/1961 | Border | 77—2 |

WILLIAM W. DYER, JR., *Primary Examiner.*

G. A. DOST, *Assistant Examiner.*